United States Patent [19]

Iya

[11] Patent Number: 4,684,513

[45] Date of Patent: Aug. 4, 1987

[54] ZONE HEATING FOR FLUIDIZED BED SILANE PYROLYSIS

[75] Inventor: Sridhar K. Iya, Vancouver, Wash.

[73] Assignee: Union Carbide Corporation, Danbury, Conn.

[21] Appl. No.: 760,573

[22] Filed: Jul. 30, 1985

Related U.S. Application Data

[62] Division of Ser. No. 439,171, Nov. 5, 1982, abandoned.

[51] Int. Cl.$^4$ ............................................. C01B 33/02
[52] U.S. Cl. ..................................... 423/349; 427/213
[58] Field of Search ...................... 423/349, 350, 348; 427/213

[56] References Cited

U.S. PATENT DOCUMENTS

4,207,360 6/1980 Padovani ............................. 423/350
4,314,525 2/1982 Hsu et al. ............................ 427/213

Primary Examiner—John Doll
Assistant Examiner—Lori S. Freeman
Attorney, Agent, or Firm—M. N. Reinisch

[57] ABSTRACT

An improved heated fluidized bed reactor and method for the production of high purity polycrystalline silicon by silane pyrolysis wherein silicon seed particles are heated in an upper heating zone of the reactor and admixed with particles in a lower reaction zone, in which zone a silane-containing gas stream, having passed through a lower cooled gas distribution zone not conducive to silane pyrolysis, contacts the heated seed particles whereon the silane is heterogeneously reduced to silicon.

8 Claims, 5 Drawing Figures

ZONE HEATING FOR FLUIDIZED BED SILANE PYROLYSIS

DESCRIPTION

1. Statement

The invention described herein was made in the performance of work under NASA Contract Number NAS 7-100, JPL No. 954334, for high purity silicon and is subject to the provisions of Section 305 of the National Aeronautics and Space Act 1958 (72 Stat. 435; 42 U.S.C. 2457).

This application is a division of prior U.S. application Ser. No. 439,171, filed 11/5/82, now abandoned.

2. Technical Field

This invention relates to an improved heated fluidized bed silane pyrolysis reactor and a method for the production of high purity silicon wherein the silicon is efficiently deposited on fluid bed particles. The improvement of the present invention comprises heating silicon seed particles in the uppermost zone of the fluidized bed reactor, admixing the heated particles from the heating zone with particles in a reaction zone therebelow by the inherent mixing characteristics of the fluidized bed and maintaining a lower gas distribution zone of the reactor at temperatures below which silane decomposes to silicon. The heating enhances heterogeneous silicon deposition on the silicon seed particles while the cool gas distribution zone diminishes the deposition of silicon thereon and on the adjacent reactor surfaces in the reaction zone and reduces the formation of silicon dust.

3. Background of the Invention

The development of new techniques for the utilization of non-polluting, renewable sources of energy is of paramount interest to meet the energy demands of the future. Solar energy is among the energy sources of greatest interest because of its non-polluting nature and its abundant, non-diminishing availability. One approach to the utilization of solar energy involves the conversion of solar energy into electricity by means of the photovoltaic effect upon the absorption of sunlight by solar cells.

Silicon solar cells, the most commonly employed devices based on the photovoltaic effect, have been utilized reliably in spacecraft applications for many years. Crystals of ultra-high purity silicon are also important for use as semiconductors in the electronics industry. However, the costs associated with the production of such high purity, high-perfection crystals for these applications and for industrial and commercial applications in general, are often not economically feasible.

High purity silicon is generally prepared by procedures involving the conversion of metallurgical grade silicon to silane or a halosilane, which is subsequently purified and then reduced to produce polycrystalline, semiconductor grade silicon from which single crystals can be grown. One such process to upgrade metallurgical grade silicon to the ultra-high purity silicon needed for either solar cell or semi-conductor usage is disclosed in U.S. Pat. No. 4,340,574 to Coleman. This process includes reaction of metallurgical grade silicon with silicon tetrachloride and hydrogen to yield an intermediate trichlorosilane and silicon tetrachloride feed stream. The intermediate feed stream is further processed in a redistribution reactor and distillation column section whereby the trichlorosilane is upgraded and separated into an ultra-high purity silane product and recycle silicon tetrachloride. The high purity silane is pyrolyzed to produce the ultra-high purity silicon product and hydrogen by-product.

It is well known in the prior art to reduce a halosilane product such as trichlorosilane to polycrystalline silicon in a reactor having carrier rods electrically heated to about 1100° C. on which reactant gases precipitate silicon. This process, commonly known as the Siemens process, is described in U.S. Pat. No. 3,979,490 to Dietze et al. This batch-type process, which is now highly commercialized, possesses high material costs and power requirements.

Another method for obtaining high purity silicon from silane or a halosilane is by pyrolysis in a fluidized bed. Silicon seed particles are suspended in a fluidizing gas stream into which silane or a halosilane is injected through some type of gas distribution apparatus. Process conditions are desirably maintained so that the silane decomposes to silicon on the surface of the seed particles in the fluidized bed. By this process seed particles grow by silicon deposition thereon and drop out of the reaction zone falling through the fluidized gas stream into a collector such as a boot-type separator. Hydrogen, which may be formed as a by-product from the silane decomposition, can be removed separately overhead from the reaction zone. When chlorosilanes are decomposed the by-product gas generally comprises hydrogen chloride.

The pyrolysis of silane or a halosilane may be achieved by capacitive heating of the fluidized bed reaction zone, as disclosed in U.S. Pat. No. 4,292,344 to McHale. Other methods of heating such as uniform induction coils, electrical resistance elements and indirect gas firing may also be utilized and are disclosed in U.S. Pat. No. 3,012,861 to Ling and U.S. Pat. No. 3,012,862 to Bertrand et al.

The decomposition of silane or a halosilane in a heated fluidized bed reactor may result in an undesirable deposit of silicon on the wall thereof or on other internal components of the fluidized bed. In some instances, as when the wall temperature in the reaction zone exceeds the temperature of the silicon seed particles, the deposition of silicon on the reactor apparatus may occur in preference to the desired deposition of silicon on the fluidized seed particles. Silane or halosilane decomposition in heated fluidized beds may also result in the homogenous decomposition of silane which produces fine silicon powder or dust. This light powder is undesirable in fluidized bed operations as it requires costly additional handling for recovery and consolidation for melting, which handling increases the risk of contaminating the ultra-pure product silicon and results in some material loss.

The need exists, therefore, for the development of an improved heated fluidized bed reactor for the production of high purity silicon for semiconductor and solar cell applications and an improved process for reducing silanes and halosilanes in a fluidized bed reactor without an accumulation of silicon on the internal surfaces therein and without the homogenous formation of silicon dust.

Hence, it is an object of this invention to provide an apparatus and a process for the enhanced heterogeneous formation of high purity silicon.

It is another object of this invention to provide an improved heated fluidized bed reactor whose interior surfaces are not preferred for the deposition of silicon thereon.

It is still another object of the invention to provide a process which enhances the heterogeneous decomposition of a silane or halosilane feed gas passed through a heated fluidized bed reaction zone and which effectively eliminates silicon deposition on the interior surfaces of the reactor.

A further object of this invention is to provide an improved process for the fluidized bed decomposition of silane and halosilanes with a minimal formation of silicon dust.

Still another object of the invention is to provide an energy efficient process for the formation of high purity silicon.

The foregoing and additional objects of this invention will become more fully apparent from the following description and accompanying drawings.

DISCLOSURE OF THE INVENTION

The invention relates to an improved fluid bed silane pyrolysis reactor comprising:

(a) a vessel closed to the ambient surroundings and having a lower inlet port for the entrance of a silane and/or halosilane-containing gas stream for the removal of silicon particles from said vessel, and an upper outlet for the removal of said gas stream and the gaseous by-products of the silane and/or halosilane decomposition;

(b) an upper heating zone in the reactor vessel having heating means therein which maintain said heating zone at temperatures between about 650° C. and about 800° C. and having silicon seed particles therein in fluid suspension at about the above-said temperatures;

(c) a reaction zone below said upper heating zone in said reactor vessel, said reaction zone effectively heated by silicon seed particles descending from said heating zone, which heating establishes and maintains a vertical temperature gradient within the fluidized bed wherein the temperature at the top of said reaction zone is from about 650° C. to about 800° C. and the temperature at the base of said reaction zone is from about 450° C. to about 650° C. and wherein said silicon seed particles at about every height throughout said reaction zone are generally hotter than the laterally disposed portion of the reaction zone wall so that silane and/or halosilane in the gas stream preferentially decompose to silicon on the seed particles in the heterogenous mode;

(d) a feed gas distribution zone below said reaction zone having cooling means for maintaining the wall and internal surfaces of said distribution zone at a temperature of from about 200° C. to about 400° C., at which temperature the reaction rate of silane and/or halosilane decomposition is effectively eliminated; and (e) a collection zone beneath said feed gas distribution zone wherein silicon-coated silicon seed particles may be removed.

The invention also relates to an improved process for the production of high purity polycrystalline silicon in a vertical fluidized bed reactor comprising the steps of:

(a) heating fluidized silicon seed particles in an upper heating zone of said reactor to a temperature of from about 650° C. to about 800° C.;

(b) maintaining a reaction zone immediately beneath said heating zone, said reaction zone effectively heated by silicon seed particles descending from said heating zone which heating establishes and maintains a vertical temperature gradient within the fluidized bed wherein the bed temperature at the top of said reaction zone is from about 650° C. to about 800° C. and the bed temperature at the base of said reaction zone is from about 450° C. to about 650° C. and wherein said silicon seed particles at about every height throughout said reaction zone are generally hotter than the laterally disposed portion of the reaction zone wall;

(c) cooling a gas distribution zone vertically below said reaction zone such that the temperature in said gas distribution zone is from about 200° C. to about 400° C.;

(d) introducing a silane and/or halosilane-containing gas stream into said gas distribution zone and passing said gas stream into said reaction zone;

(e) decomposing said silane and/or halosilane onto said silicon seed particles, which particles being the hottest component of said reaction zone thereby enhancing the heterogeneous formation of silicon on said silicon seed particles and minimizing the deposition of silicon on the internal surfaces of said reactor and the undesirable homogeneous formation of silicon powder within said reactor;

(f) removing the unreacted portion of said gas stream and the gaseous by-products of said silane and/or halosilane decomposition; and (g) collecting the silicon-coated silicon seed particles whereby silicon is obtained continuously or semicontinuously as low-cost, high purity polycrystalline silicon.

In accordance with the present invention an improved fluid bed reactor utilizes variable zone heating to accomplish efficient thermal decomposition of silane and halosilanes onto silicon fluid bed particles and provides a process for the thermal decomposition of silane and halosilanes to silicon in the heterogenous mode with a marked preference for deposition onto the silicon seed particles in the fluidized bed and not on the interior surfaces of the reactor. Further, the present invention utilizes heating efficiently so as to reduce the power requirements needed to produce silicon.

As used herein, heterogeneous decomposition refers to the reduction of silane or a halosilane to silicon which occurs in two or more phases as when the decomposition occurs at a boundary between the gas and solid phase. This heterogenous decomposition results in deposition of silicon on either suspended silicon particles in the fluidized bed or on the internal surfaces of the fluidized bed reactor. Homogenous decomposition occurs in a single phase such as the gas phase and produces light, high surface area silicon powder or dust. At a given temperature, the decomposition of silane and halosilanes will be either heterogeneous or homogenous depending on the silane or halosilane concentration. At 1000° K. the decomposition reaction is heterogeneous if the silane and/or halosilane concentration is maintained below about $10^{-2}$ mole fraction. By mole fraction is meant the number of moles of silane and/or halosilane in a unit volume of the inlet gas stream divided by the total number of moles per unit volume of the inlet gas stream. The relationship between the heterogeneous and homogeneous decomposition of silanes is reported in the literature as in "Influence of $AsH_3$, $PH_3$ and $B_2H_6$ on the Growth Rate and Resistivity of Polycrystallines Silicon Film Deposited from a $SiH_4$-$H_2$ Mixture", Eversteyn and Put, Journal of Electrochemical Society, Solid State Science and Technology, January 1973, Volume 120, No. 1, pages 106-110. Generally, a low silane/halosilane feed concentration is desirable to maintain the decomposition of silane and halosilane to silicon in a heterogeneous mode. However, a very low feed concentration of silane and/or halosilane may not provide a high production rate of silicon.

For the pyrolysis of silane and halosilanes in the fluidized bed reactor the decomposition reaction preferably proceeds in the heterogenous mode. In this manner silicon formed by reducing silane and/or halosilane is deposited on silicon particles suspended in the fluidized bed. Silicon deposition on the walls or internal surfaces of the reactor may be significantly avoided by selectively maintaining the reactor surfaces at a temperature below which the decomposition of silane or halosilane to silicon takes place and/or by maintaining the reactor surfaces at a temperature below that of adjacent and nearby silicon particles in the fluidized bed so that the deposition of silicon is directed towards the higher-temperature seed particles.

It is known that silane and halosilane decomposition to silicon is dependent on the reaction temperature. As reported in "A Stagnant Layer Model for the Epitaxial Growth of Silicon from Silane in a Horizontal Reactor", F. C. Eversteyn, Journal of Electrochemical Society, Solid State Science and Technology, July 1970, vol. 117 no. 7 page 925, the decomposition reaction to form silicon increases significantly with increasing temperature. The decomposition rate of silane and/or halosilane increases at a ten-fold rate from about 575° C. to about 675° C. and increases again at a ten-fold rate from about 675° C. to about 775° C. Thus, high reaction temperatures are desirable to achieve a high decomposition rate of silane and halosilane to silicon.

The fluidized bed reactor in accordance with this invention is a vertical, generally cylindrical vessel wherein high purity silicon is deposited on silicon seed particles suspended in the fluidized bed. The ratio of bed height to bed diameter may be from about 2:1 to about 20:1, preferably about 10:1. The silicon seed particles are fluidized by a gas stream made up of the silane and/or halosilane feed and a recycle by-product gas stream or an inert gas stream or a combination thereof, such that the silane/halosilane concentration is between about 10% and about 100%, preferably about 50% based on the volume of the gas stream.

From about 70 to about 90 percent of the total heat input of the fluidized bed reactor is provided in the uppermost section of the vessel, the heating zone, which may occupy about the uppermost twenty-five percent of the total volume of the reactor. Heat may be supplied to this zone and to the silicon seed particles raised through the fluid bed to this zone by wall and/or immersion heaters, such as resistance heaters, which heat the fluidized bed particles to from about 650° C. to about 800° C., preferably about 700° C.

The reaction zone immediately beneath the heating zone occupies the remaining portion of the fluidized bed. This portion of the fluidized bed is primarily heated by interacting with hot silicon particles from the upper heating zone of the reactor. Guard heaters disposed around the circumference of the reaction zone supply only that heat necessary to compensate for heat losses. The reactor wall temperature at the base of the fluidized bed is from about 300° C. to about 600° C., preferably about 450° C. The temperature of the fluidized bed at its base is from about 450° C. to about 650° C. The temperature of the fluidized bed at its top, which is in intimate contact with the heating zone, is from about 650° C. to about 800° C. Typically the fluidized bed temperature in the reaction zone is maintained at a gradient of from about 550° C. at the base of the fluidized bed to about 700° C. at the top of the reaction zone. At every height in the reaction zone the temperature of the fluidized bed is greater than the reactor wall temperature so that the feed silane and halosilane is preferentially decomposed to silicon on the surface of the fluidized bed particles.

Beneath the reaction zone, the reactor employs a gas distributor for the introduction of the feed and other possible fluidizing gas streams, and where seed particles to be fluidized may optionally be introduced and/or generated. The ratio of gas velocity to minimum fluidization velocity just above the distributor is from about 2:1 to about 6:1, preferably about 4:1. In this gas distribution zone, the reactor walls are cooled to a range of from about 200° C. to about 400° C., by cooling water, nitrogen or the like, at which temperatures the decomposition of silane and halosilane to silicon is not favored so that little silicon is formed in this zone. Because of the concentration of silane and/or halosilane in the feed stream, silicon formation in this zone may be homogeneous, producing silicon powder that may obstruct openings in this portion of the reactor if the silicon production rate therein were significant.

The reactor further employs a collector means such as a boot separator or the like at its base to segregate product particles of predetermined size from the seed particles, which may also be introduced in this section, and to accumulate product silicon particles. This product withdrawal zone is relatively cool, having a temperature below about 200° C.

The silicon seed particles used in the above-described reactor and process have typical initial diameters of about 40 to about 400 microns depending on the size of the ractor. The size of the particles comprising the fluidized bed is not critical to the invention and may be maintained within the limits commonly employed in various fluidized bed applications known in the art.

In accordance with the process of this invention, as the silane and/or halosilane decompose to silicon, the seed particles grow in size to about 400 microns and larger whereupon these product particles descend from the fluidized bed. Additional seed particles are introduced into the reactor to maintain the process. Fluidization conditions in the boot separator are established so as to allow only larger silicon particles to settle within the chamber of the boot vessel while transporting the seed size particles into the fluidized bed reaction zone. These large product particles can then be either continuously or periodically removed as product material. Such large particles are of sufficient size to be easily handled without any undue contamination of the ultra-high purity material.

Thus the present invention provides a fluidized bed silane pyrolysis reactor wherein silicon bed particles are heated in the uppermost portion of the reactor, a heating zone, and which particles then transfer heat to the reaction zone wherein the bed particles maintain a higher temperature than the walls of the reactor in the reaction zone, so that the thermal heterogeneous decomposition of silane to silicon preferentially occurs on silicon bed particles, the wall temperature of the reactor not being as preferred for the decomposition reaction. The present invention has been found to effectively utilize heating so as to reduce the overall power requirements to produce silicon.

BRIEF DESCRIPTION OF THE DRAWINGS

The present invention will become more apparent from the following description thereof when considered together with the accompanying drawings which are set forth as being merely illustrative of the invention and are not intended in any manner to be limitative thereof and wherein.

Common components in each of the Figures are identified with the same reference number.

As used herein, reference to silane includes silane and the halosilanes.

DETAILED DESCRIPTION OF THE DRAWINGS

Figure 1:
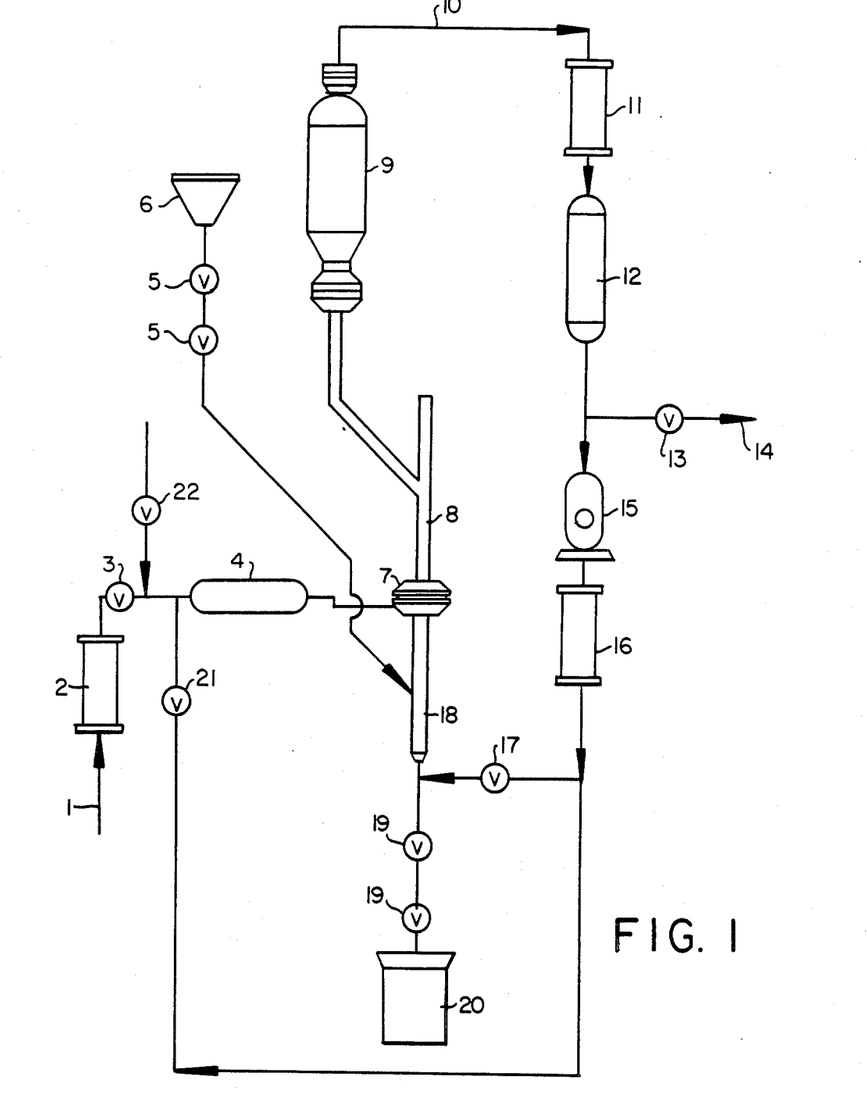
FIG. 1 is a schematic representation of the process for silane pyrolysis to form silicon.

As shown in the schematic representation of FIG. 1, the high purity silane to be pyrolyzed enters through conduit 1 to heat exchanger 2, which may be used to preheat the silane or simply to insure a constant feed temperature of about 25° C. Valves 3, 21 and 22 control the flow of the feed silane, recycle by-product gases, and secondary diluent, if one is desired, respectively. These feed streams are homogenized in mixer 4 before being introduced in the gas distributor 7 of the reaction vessel 8.

The general function of the gas distributor 7 is to allow introduction of the gaseous streams in a way that efficiently fluidizes the particles in the bed. The decomposition of silane occurs in the fluidized bed reaction vessel 8. The expanded head 9 reduces the velocity of the by-product gases exiting the top of the reactor.

Product, high-purity silicon particles are separated from smaller-diameter seed particles in the boot separator 18, a small diameter cylindrical vessel located below the reaction vessel 8 and distributor 7. Seed particles on which decomposition will occur may be introduced in boot separator 18 through valve 5 from seed particle hopper 6. Some of the silane gas, by-product gases and/or inert gas is circulated through boot separator 18 and into fluidized bed 8. The gas flow is regulated so that smaller particles are carried from the boot separator and maintained within the bed until they reach a larger size, at which time they settle from the fluidized bed into the boot separator 18 and can be removed as product material through control valves 19 and stored in product hopper 20.

The by-product gas stream 10 taken from the top of the bed is cooled in heat exchanger 11 and any entrained dust is removed in filter 12. A by-product gas stream 14, which may comprise hydrogen fuel in the case of silane pyrolysis, may then be bled from the loop by valve 13 for other use in the silane production process or elsewhere. The remaining recycle by-product gas is compressed in compressor 15 sufficiently to be returned to the bed operating pressure of from about 5 to about 10 psig after equipment pressure drops and is reheated in heat exchanger 16. The recycle hydrogen stream can be directed through valve 17 to the bottom of boot separator 18 for fluidization of particles therein and/or can be directed through valve 21 for use as a diluent for the silane feed stream, as previously described.

Figure 2:
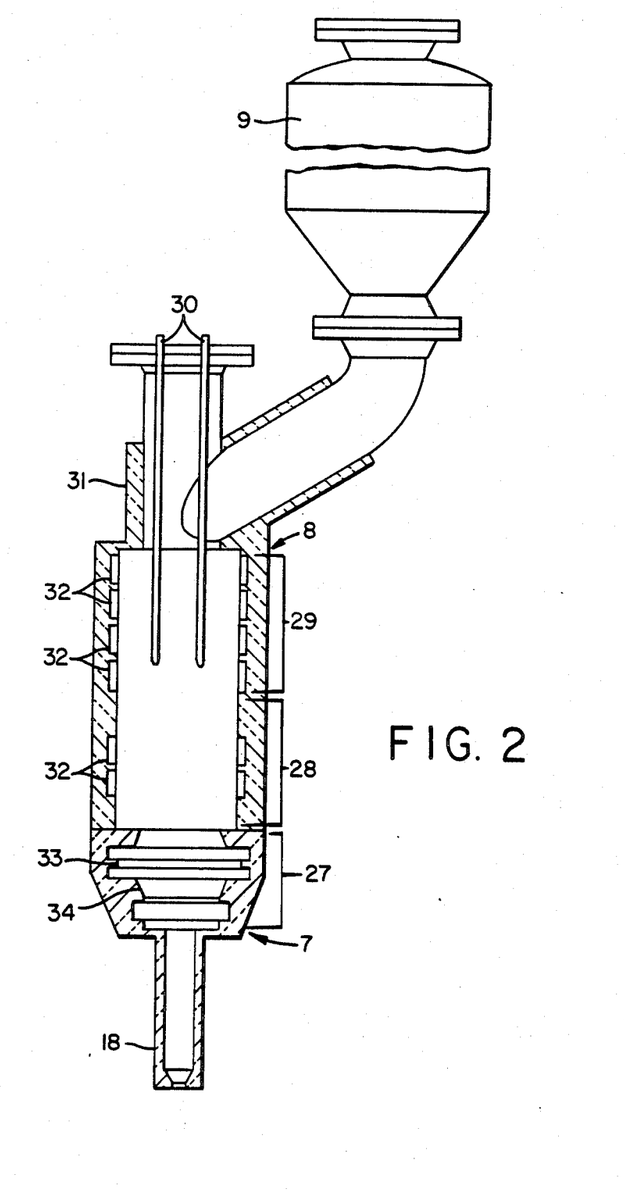
FIG. 2 is a partial cross-section of the reaction vessel showing the heating, reaction and distribution zones.

The fluidized bed reactor 8 is shown in cross-section in FIG. 2. The internal surfaces of the reaction vessel is preferably a non-contaminating surface such as incoloy alloy. Wall heaters 32 encircling reaction vessel 8 may be used separately or in conjunction with immersion heaters 30 suspended from the top of reaction vessel 8 to apply heat to bed particles in the heating zone. References to wall temperatures in this description are intended to include the surface temperature of immersion heaters 30. Further, it is within the scope of this invention to heat the bed in the heating zone exclusively with immersion heaters 30 or any other heating means that would accomplish the same end. Expanded head 9 is shown positioned slightly to the side of vessel 8 to permit easy access to bed internals and to minimize the required length of immersion heaters 30.

During operation, the majority of heat input, about 70 to 90 percent of the total heat input, preferably 80 percent, is provided in the heating zone 29 which is shown occupying about the top 2½ bed diameters of the reaction vessel 8. The ratio of bed height to bed diameter is generally from 2:1 to 20:1 but is preferably about 10:1. The heaters 32 encircling the vessel 8 any be ceramic or the like, but the immersion heaters 30 should preferably have a non-contaminating surface, for example quartz or the alloy incoloy. These resistance-type heaters are operated so that the bed temperature in this zone 29 is from about 650° C. to 800° C. Within the heating zone 29, the heat may be applied uniformly or in a gradient with the same effect. Since the heating zone is relatively short when compared to bed diameter, the inherent mixing of the fluidized bed tends to equilibrate the temperature in this heating zone.

The remainder of the heat input is applied in the reaction zone 28 by wall heaters 32 so that the wall temperature at the bottom of the vessel 8 is from about 300° C. to about 600° C., and the bed temperature at its base is between 450° C. and 650° C., preferably about 550° C. These heaters essentially provide heat only to compensate for heat losses. The majority of the heat in the reaction zone 28 comes from fluidized bed particles from the heating zone 29. The mixing which occurs in the fluidized bed is responsible for heating the particles in the reaction zone 28. The temperature gradient in the reaction zone is a result of the heating zone 29 above and the relatively cool gas distribution zone 27 below.

Annular cooling means 33 surrounds the gas distributor 7. Fluidizing cone 34 of the distributor 7 allows introduction of the feed stream gases. The entire assembly of reaction vessel 8, distributor 7 and boot separator 18 is encased by insulation 31.

Figure 3:
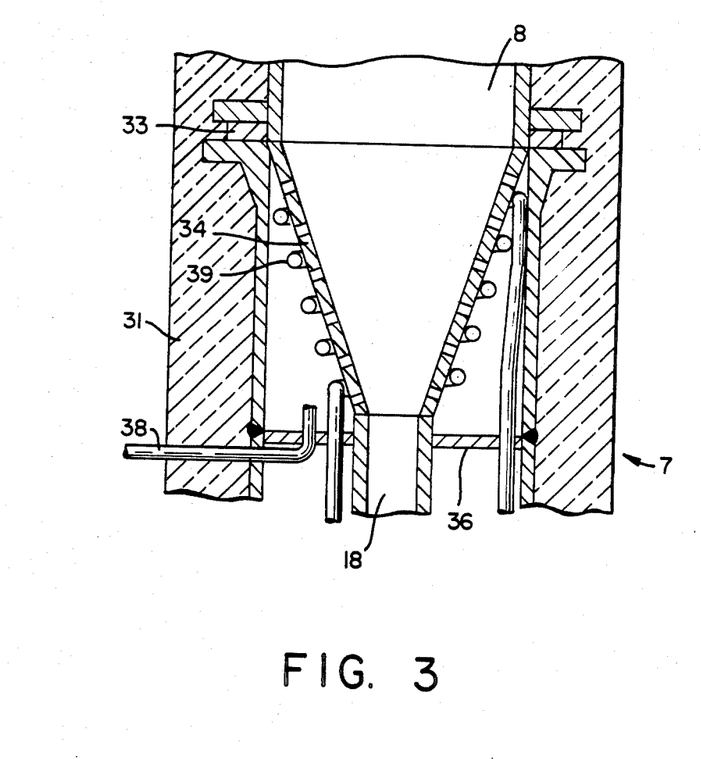
FIG. 3 is a partial cross-section of the gas distribution zone.

FIG. 3 shows the gas distributor 7 in detail. The uniformly perforated fluidizing cone 34 is encircled by cooling coils 39. Supplemental cooling may be provided by annular cooling means 33 at the base of the fluidized bed 8. The fluidizing feed gases are introduced through inlet 38 and directed properly toward cone 34 by annular dividing means 36, which seals off the region defined by cone 34 and distributor casing 37. The gas distribution zone is shown encased by insulation 31.

The distributor 7 is cooled to about 300° C. by cooling water, nitrogen, or any well known means. The perforated metal cone 34 of the distributor 7 provides the means for feed stream introduction whereby the bed particles are fluidized uniformly. The ratio of feed stream superficial gas velocity to minimum fluidization velocity just above the distributor is generally between 2:0 and 6:0. This ratio increases with temperature, so the preferred ratio may be about 7:1 or 8:1 at the top of the bed. The composition of the feed stream may be between about 10 and about 100 percent silane by volume, but is typically about 50 percent by volume.

Figure 4:
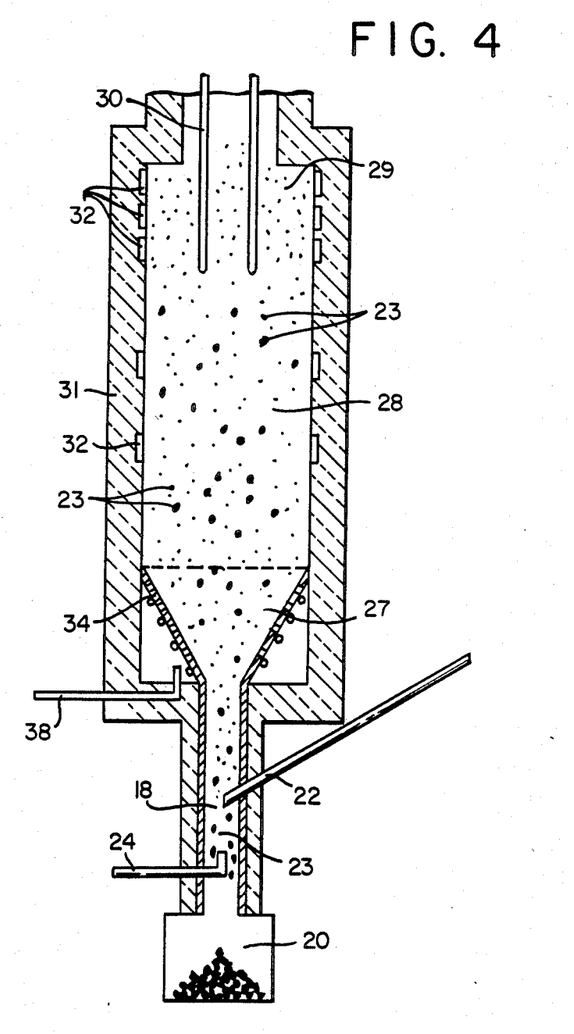
FIG. 4 is a partial cross-section of the reaction vessel showing the distribution of seed particles therein.

FIG. 4 shows a typical distribution of silicon seed particles in a vertical cross-section of a fluidized bed reactor in accordance with this invention. The silicon seed particles, some of which are designated by the number 23, are shown introduced into separator 18 through inlet 22. These particles have initial diameters of from about 40 to about 400 microns. The seed particles are entrained in a gas stream which enters through inlet 24 containing inert gases and/or recirculant by-product gases which causes the particles to ascend into the fluidized bed.

Silicon seed particles having relatively small diameters rise through the reaction zone 28 where they intermixed with and are heated by other silicon particles. The temperature of the fluidized bed in the reaction zone ranges from about 450° C. to about 650° C. at its base to from about 650° C. to about 800° C. at its top. Above the reaction zone is the heating zone 29 wherein a temperature between about 650° C. and 800° C. is maintained by the use of heating means such as wall heaters 32 and immersion heaters 30. Small diameter silicon seed particles rise into the heating zone and attain a temperature substantially equal to the temperature in the heating zone. The particles return to the reaction zone 28 by the inherent mixing action of the fluidized bed. Heat is transferred between particles so as to maintain the temperature and the temperature gradient of the reaction zone.

A feed stream containing silane is introduced through inlet 38. The feed gas stream passes through the perforations in fluidizing cone 34 and enters into the reaction zone 28 of the fluidized bed.

Silane is reduced in the reaction zone and deposits silicon preferentially on the hot silicon particles. A high silane concentration is the feed gas stream entering at the base of the fluidized bed is exposed to a sufficiently low reaction temperature so as to favor heterogeneous decomposition over homogenous decomposition. As the feed gas stream advances upward through the reaction zone the silane concentration decreases as the bed temperature increases which promote higher reaction rates that continue to favor heterogeneous decomposition. At the top of the reaction zone, substantially all of the silane in the feed gas stream has decomposed. As product silicon is deposited on the seed particles, the particles grow in size. When the diameter of a product silicon particle is from about 400 to about 1500 microns or larger, depending on the size of the reactor, the particle descends from the reaction zone 28, past the gas distribution zone 27 and the separator 18, and into a collector 20.

The following example further illustrates the present invention:

EXAMPLE

The reactor and process of this invention as depicted in the preceding figures were used to thermally decompose silane to silicon.

The reactor had a bed height of 72 inches and a bed diameter of 6 inches for a bed height-to-diameter ratio of 12:1. Approximately 8 Kw of power in the form of heat were supplied to the top 15 inches of the bed, the heating zone, and approximately 2 Kw were supplied over the remainder of the bed, the reaction zone. Bed operating pressure was about 5 psig. The distributor temperature was 319° C. and the ratio of superficial feed stream velocity to minimum fluidization velocity was 4:1 at the bottom of the bed. The feed stream of 21.6 volume percent silane was introduced at a temperature of about 25° C. and a pressure of about 30 psig and provided a 1 Kg silicon per hour throughput.

In the zoned heating concept of the present invention, the highest temperature occurs in the heating zone, where the silane has essentially all reacted. Since the silane concentration is extremely low, it is not likely to plate on the walls or to form powder. The reaction zone contains fluidized bed particles that have been heated by back mixing of the particles from the heating zone. These particles are hotter than the walls in this zone, so silicon deposition on particle surfaces is favored over deposition on the reactor walls. The low distributor temperature inhibits decomposition of silicon on its wall because the reaction rate of silane to silicon and by-product hydrogen is very low at this temperature. By maintaining the temperatures in these zones, the silane pyrolysis occurs continuously with no significant plating of silicon on the reactor surfaces nor any significant homogeneous silicon powder accumulation in the reactor to obstruct the operation of the reactor.

Figure 5:
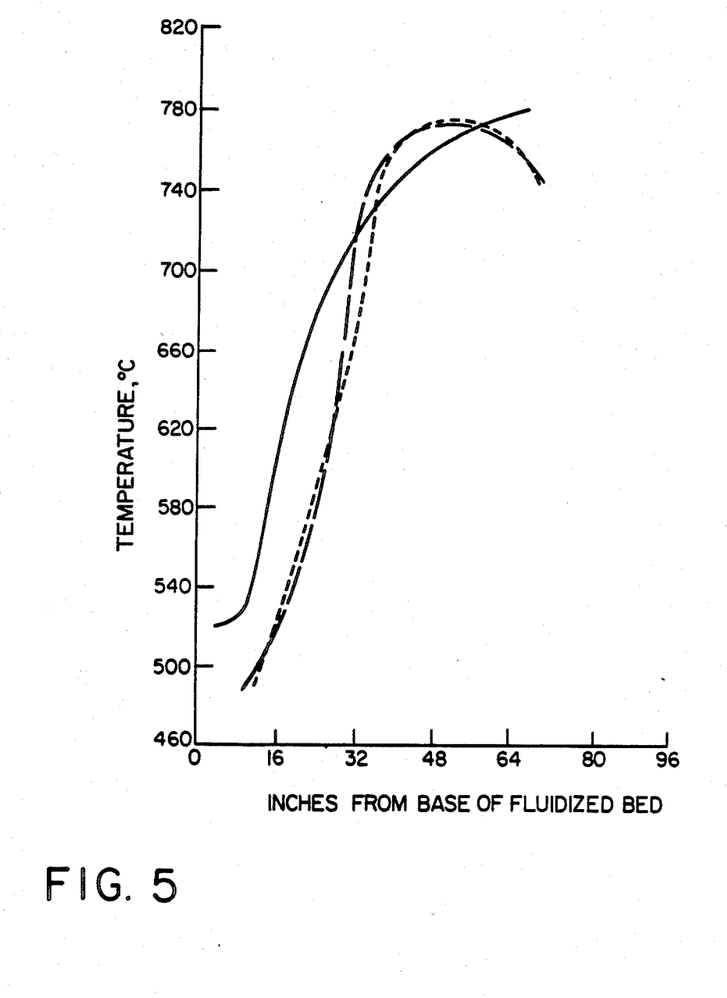
FIG. 5 shows the temperature profiles of the three zones.

The temperature profiles of these three zones are shown in FIG. 5. The temperature along the center of the fluidized bed is shown as a solid line. The temperature of the fluidized bed adjacent to the reactor wall is shown as a dashed line. The temperature of the reactor wall is depicted as a dotted line. As can be seen from the Figure, the temperature of the fluidized bed particles at a given height is higher than the wall temperature at that height over most of the height of the fluidized bed. This temperature differential is most pronounced in the lower portion of the fluidized bed where most of the silane pyrolysis occurs.

The 10 KW power input which yielded about 1 Kg silicon per hour in accordance with the present invention is approximately thirty times as energy efficient as the Siemen's process as disclosed in U.S. Pat. No. 3,979,490 and may represent a savings over other fluidized bed processes.

It is to be understood that modifications and changes to the preferred embodiment of the invention herein described and shown can be made without departing from the spirit and scope of the invention.

I claim:

1. An improved process for the production of polycrystalline silicon in a vertical fluidized bed reactor into which silane feed gas is introduced comprising the steps of:
   (a) establishing an upper heating zone in said reactor at a temperature of from about 650° C. to about 800° C. and with at least 70 to 90% of the heat input to the reactor being introduced into the upper heating zone;
   (b) maintaining a reaction zone immediately beneath said heating zone with said reaction zone being effectively heated by silicon seed particles descending from said heating zone to form a vertical temperature gradient within the fluidized bed having a temperature at the top of said reaction zone equal to about the temperature of the upper heating zone and having a bed temperature at the base of said reaction zone from about 450° C. to about 650° C. and a horizontal temperature gradient wherein said silicon seed particles at every height throughout said reaction zone are generally hotter than the laterally disposed portion of the reaction zone wall;

(c) cooling a gas distribution zone in said reactor located vertically below said reaction zone such that the temperature in said gas distribution zone is from about 200° C. to about 400° C.;

(d) introducing a stream of silane and/or halosilane-containing feed gas into said gas distribution zone and passing said feed gas into said reaction zone;

(e) decomposing substantially all of said silane and/or halosilane feed gas for deposition onto said silicon seed particles within the reaction zone, which particles being the hottest component of said reaction zone thereby enhancing the heterogeneous formation of silicon on said silicon seed particles and minimizing the deposition of silicon on the internal surfaces of said reactor and the undesirable homogeneous formation of silicon powder within said reactor;

(f) removing the unreacted portion of said gas stream and the gaseous by-products of said silane and/or halosilane decomposition; and (g) collecting the silicon-coated silicon seed particles whereby silicon is obtained continuously or semi-continuously as low-cost, high purity polycrystalline silicon.

2. The process in accordance with claim 1 wherein said heating zone is heated to about 700° C.

3. The process in accordance with claim 1 wherein the fluidized bed in said reaction zone has a temperture of about 700° C. at its top and about 550° C. at its base.

4. The process in accordance with claim 1 wherein the bed temperature at the base of said reaction zone is about 550° C. and the temperature of the reactor wall at the base of said reaction zone is 450° C.

5. The process in accordance with claim 1 wherein the ratio of gas velocity to minimum fluidization velocity immediately above said gas distribution zone is from about 2:1 to about 6:1.

6. The process in accordance with claim 1 wherein the ratio of gas velocity to minimum fluidization velocity immediately above said gas distribution zone is about 4:1.

7. The process in accordance with claim 1 wherein the concentration of silane and/or halosilane in said gas stream is between about 10% and about 100%.

8. The process in accordance with claim 1 wherein the concentration of silane and/or halosilane in said gas stream is about 50%.

* * * * *